(12) United States Patent
Kinoshita

(10) Patent No.: US 7,536,445 B2
(45) Date of Patent: May 19, 2009

(54) ENABLING A WEB-CRAWLING ROBOT TO COLLECT INFORMATION FROM WEB SITES THAT TAILOR INFORMATION CONTENT TO THE CAPABILITIES OF ACCESSING DEVICES

(75) Inventor: Takafumi Kinoshita, Machida (JP)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 10/751,767

(22) Filed: Jan. 5, 2004

(65) Prior Publication Data

US 2004/0205114 A1    Oct. 14, 2004

(30) Foreign Application Priority Data

Feb. 25, 2003   (JP)   ............................. 2003-047983

(51) Int. Cl.
*G06F 15/16* (2006.01)
(52) U.S. Cl. ..................................................... 709/217
(58) Field of Classification Search ................. 709/202, 709/216, 217
See application file for complete search history.

(56) References Cited

U.S. PATENT DOCUMENTS 6,167,441 A * 12/2000 Himmel ...................... 709/217

2002/0078014 A1 * 6/2002 Pallmann ...................... 707/1

FOREIGN PATENT DOCUMENTS

| JP | 2002-215642 | 8/2002 |
| JP | 2002-259432 | 9/2002 |
| JP | 2001-325269 A | 11/2002 |

OTHER PUBLICATIONS

"Providing Data for a Crawler_Improving Web usability", Open Design, vol. No. 5, pp. 86-101.

* cited by examiner

*Primary Examiner*—Jeffrey Pwu
*Assistant Examiner*—Farhad Ali
(74) *Attorney, Agent, or Firm*—Hoffman Warnick LLC; Robert Straight

(57) ABSTRACT

A web-crawling robot retrieves information from a web server that tailors information content to the capability of an accessing device. A link deriving unit in a proxy server for relaying data exchanged between the robot and the site analyzes a response from the site to the robot, and acquires information on a user agent corresponding to a particular kind of content of a link destination. On the basis of the information, a user agent information editing unit in the proxy server adds user agent information to the content retrieval request from the web-crawling robot to the site so as to disguise it as a content retrieval request issued from a given user agent, thereby acquiring a response corresponding to capabilities of the user agent.

16 Claims, 15 Drawing Sheets

FIG. 7

| Diversity URL | User agent value | Substitute URL |
|---|---|---|
| www.cp_X.com/page_1.html | device_A | www.cp_X.com/page_1.html.for.device_A |
| www.cp_X.com/page_1.html | device_B | www.cp_X.com/page_1.html.for.device_B |
| www.cp_Z.com/ab/cd/page_11.html | device_A | www.cp_Z.com/ab/cd/page_11.html.for.device_A |

ENABLING A WEB-CRAWLING ROBOT TO COLLECT INFORMATION FROM WEB SITES THAT TAILOR INFORMATION CONTENT TO THE CAPABILITIES OF ACCESSING DEVICES

FIELD OF THE INVENTION

The present invention relates to a search engine used for searching information on the Internet, and more particularly to a web-crawling robot for automatically collecting such information.

BACKGROUND

Today, various services are provided via networks, especially by the Internet. Various types of client devices that can be connected to the network range from high performance computers such as a personal computers and work stations to simple terminals such as mobile phones and personal digital assistants (PDAs) that are suitable mainly for receiving, displaying, and performing simplified processes. Therefore, many web sites (web servers) dynamically create different kinds of content to provide services according to the capabilities of connected client devices or user agents.

A web server that returns web content according to the type of the client device can identify the type of the client device by referring to a User-Agent HTTP header in the HTTP (Hypertext Transfer Protocol) request from the client device. Using this mechanism, the server can create and return web content that is tailored according to the capability of the client.

Tailoring the content according to the capability of the client device means that, for example, the content is segmented according to the client's memory capacity (i.e., the size of data that can be read at one time) and downloaded in multiple segments, or the content of text is altered to exclude images for client devices without the capability to display images.

It is now commonplace to use a search engine or search site to select and acquire desired content from the enormous storehouse of information provided by the world wide web. The search site acquires in advance and holds information about gaining access to the content of the web and returns the information to the client upon request. One of the principal search sites today uses a robot for automatically gaining access to a site on the network while following a hyperlink (hereinafter referred to as a link) to the content, collecting the information for accessing the content at the site, and responding to the search request from the client device. For example, such systems are described in Japanese Published Unexamined Patent Applications No. 2002-215642 and No. 2002-259432.

FIG. 17 is a block diagram showing the configuration of a robot type search site. As shown in FIG. 17, the robot type search site 1710 comprises a web-crawling robot 1711 for automatically gaining access to a site 1720 on a network to acquire information for accessing the content at the site, a database 1712 for registering and accumulating the information acquired from the web-crawling robot 1711, and a search engine 1713 for searching the database 1712 by accepting a search request from a client device 1730 and returning the search result.

As described above, at the robot type search site, the web-crawling robot gains access to the site on the network, and acquires the information (e.g., URL (uniform resource locators)) for accessing the content. However, when the web-crawling robot gains access to a site that dynamically creates content according to the capability of the client, the site recognizes the access as being from the web-crawling robot, and responds accordingly. Unfortunately, this means that the web-crawling robot cannot acquire all of the different adaptations of the information potentially provided by the site according to the clients' capabilities. Also, some sites may invoke an error processing routine for the unknown type of access, or just assume an appropriate type. These actions may degrade the reliability of the search site.

Assume, for example, that a site S1 has content C1 of size 5 KB, which may be sent in two ways. The first way is to send the 5 KB as a single block to a client device A that has a maximum readable data capacity of, for example, 6 KB. The second way is to segment the content and send the segments sequentially as c01, c02 and c03, of 2 KB, 2 KB, and 1 KB, respectively, to a client B that has a maximum readable data capacity of 2 KB.

At the time of the search by the web-crawling robot, the site S1 determines that the web-crawling robot is the client device A. Thus, only the content C1 having a size of 5 KB is registered in the database at the search site S2.

Now suppose that the client device B retrieves the content associated with a predetermined search term at the search site S2, and hits the content C1. When the client device B sends an HTTP request to the site S1 in accordance with this search result, the content c01 that is one of three segments is returned from the site S1, as described above. At this time, if the hit search term exists in the content c02 or c03, the client device B cannot obtain the desired information, even though it has made its access on the basis of the search results at the search site S2.

The aforementioned Japanese Published Unexamined Patent Application No. 2002-259432 discloses a technique for analyzing the substance of the content to calculate and evaluate the degree to which the predetermined content is suitable for the client device, and choosing the search result that is most appropriate for the type of client device to the extent possible. However, the disclosed technique does not allow for the acquisition of content in consideration of the various types of client devices when the web-crawling robot collects the content.

SUMMARY

Thus, an object of the present invention is to enable a site to acquire information on contents classified by type of corresponding terminal from sites that dynamically create the content, and to return an individual response according to the type of client device when a web-crawling robot collects information.

In order to accomplish the above and other objects, the present invention includes a server that comprises a proxy function unit for relaying data exchanged between a site on a network and a web-crawling robot collecting contents by accessing the site, a link deriving unit for expanding a link concerned and acquiring information on a user agent corresponding to the content of a link destination concerned when the proxy function unit receives a response from the site to a content retrieval request issued from the web-crawling robot to the site and if the link destination of the link included in the response has content that individually returns different responses according to the type of user agent which is an access source, and a user agent information editing unit for converting user agent information included in the content retrieval request to the user agent information corresponding to the content of the link destination when the proxy function unit receives the content retrieval request from the web-crawling robot issued on the basis of the derived link.

This server may further comprise a database for registering in association the location information (URL) of the content that individually returns different responses according to the type of user agent which is the access source and the user agent information corresponding to the content. In this case, the link deriving unit searches the database with the URL information of the link destination of the link included in the response as an argument to acquire the information of the user agent. Also, the user agent information editing unit converts the information of the content retrieval request, employing the user agent information obtained from the database.

Also, the invention includes a server that comprises first transmitter-receiver means for exchanging data with a web-crawling robot, editing means for converting user agent information, which is included in a content retrieval request from the web-crawling robot to the site, received by the first transmitter-receiver means to specific user agent information for disguising it as a content retrieval request issued from a predetermined user agent, and second transmitter-receiver means for exchanging data with the site and sending the user agent information converted to the content retrieval request by the editing means to the destination site.

This server may further comprise analysis means for analyzing the response from the site to the web-crawling robot, received by the second transmitter-receiver means. In this case, the editing means designates the predetermined user agent on the basis of the information analyzed by the analysis means and converts the user agent information of the content retrieval request to the user agent information of the designated user agent.

Preferably, in this server, the analysis means replaces the link destination information of the link with the dummy information including identification information for identifying the user agent corresponding to the content of the link destination to cause the first transmitter-receiver means to send it to the web-crawling robot, if the link destination of the link included in the response has the content that individually returns responses according to a type of user agent which is an access source. Further, the editing means restores the dummy information to original link destination information, when the first transmitter-receiver means receives a content retrieval request issued from the web-crawling robot with the dummy information as a destination, and converts the user agent information included in the content retrieval request to the user agent information of the user agent designated by the identification information included in the dummy information.

The invention also include a server that comprises a proxy function unit for relaying data exchanged between a web site on a network and a web-crawling robot collecting information by accessing the web site, a link deriving unit for replacing uniform resource locators (URL) to be a link destination of a link included in a response concerned with substitute URL individually corresponding to the user agent corresponding to a web content concerned when the proxy function unit receives a response from the web site to a content retrieval request issued from the web-crawling robot to the web site and if the link destination of the link included in the response has the web content that individually returns different responses according to a type of user agent which is an access source, a URL conversion unit for replacing the substitute URL with the original URL of the link destination when the proxy function unit receives a content retrieval request issued from the web-crawling robot to the substitute URL as a destination, and a user agent information editing unit for converting user agent information at a hypertext transfer protocol (HTTP) header of the content retrieval request to the user agent information corresponding to the substitute URL when the proxy function unit receives the content retrieval request issued from the web-crawling robot to the substitute URL as a destination.

The above servers may be part of the server having the web-crawling robot, or part of the server having the web site. Moreover, apart from these servers, the server machine may be provided on the network.

The invention also includes a method of collecting information from a site on a network as follows. That is, the information collecting method comprises a step of receiving a response from the site to a content retrieval request issued to the predetermined site and, if a link destination of a link included in the received response has content that individually returns different responses according to the type of user agent which is an access source, deriving the link and acquiring information on a user agent corresponding to the content of the link destination, a step of sending a content retrieval request having additional information for disguising it as a content retrieval request issued from the user agent to the link destination of the link included in the response on the basis of the user agent information, and a step of acquiring a response according to the type of user agent from the link destination.

The invention also includes a method of collecting information, comprising a first step of receiving a response from the site to a content retrieval request issued from a predetermined web-crawling robot to the predetermined site and, if a link destination of a link included in the received response has a web content that individually returns different responses according to a type of user agent which is an access source, replacing URL which is the link destination of the link included in the response with substitute URL individually corresponding to the user agent corresponding to the web content and sending it to the web-crawling robot which is a destination of sending the response, a second step of receiving the content retrieval request issued from the web-crawling robot to the substitute URL as a destination, replacing the substitute URL with the original link destination URL, converting user agent information at an HTTP header of the content retrieval request to information on the user agent corresponding to the substitute URL, and sending it to the link destination, and a third step of receiving a response from the link destination to the content retrieval request whose user agent information was converted, adding identification information of the user agent to the response, and sending it to the web-crawling robot.

Moreover, this invention also includes a program for implementing the functions of the server by controlling the computer, and a program for causing the computer to execute the steps of the information acquisition method. Programs may be distributed and stored in magnetic disks, optical disks, semiconductor memory, or other storage units, or distributed and provided via the network.

BRIEF DESCRIPTION OF THE DRAWINGS

FIG. 7 is a table showing exemplary information registered in a diversity URL database.

DETAILED DESCRIPTION

Preferred embodiments of this invention will be described below in detail with reference to the accompanying drawings.

Figure 1:
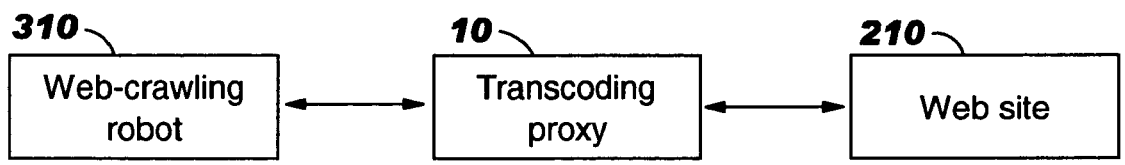
FIG. 1 is a diagram for explaining the concept of a robot search according to the present invention.

FIG. 1 is a diagram for explaining the concept of a robot search according to the present invention. As shown in FIG. 1, a transcoding proxy 10 for converting a request from the web-crawling robot 310 and a response from the site 210 is interposed between a web site 210 for providing the content and a web-crawling robot 310 for performing the robot search. Thereby, in collecting the information by robot search, it is possible to acquire information on content, classified by the type of client device, from a site that dynamically creates and tailors the content according to the type of client device.

Figure 2:
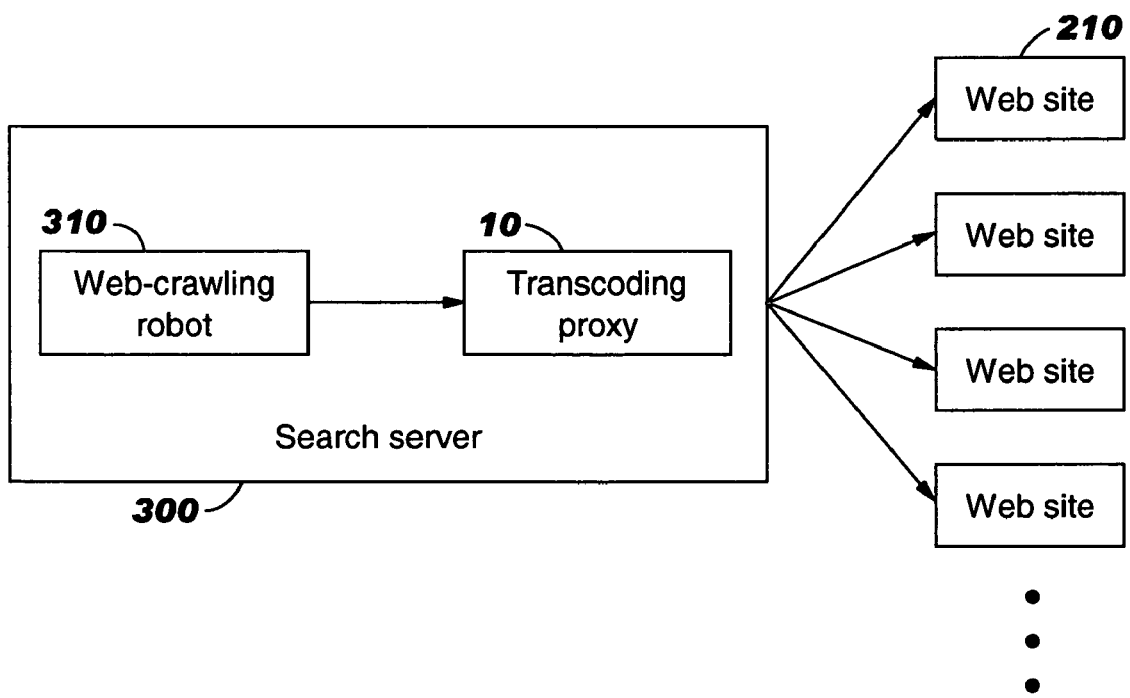
FIG. 2 is a block diagram showing an exemplary configuration in which a transcoding proxy of the invention is provided with a web-crawling robot in a search server.
Figure 3:
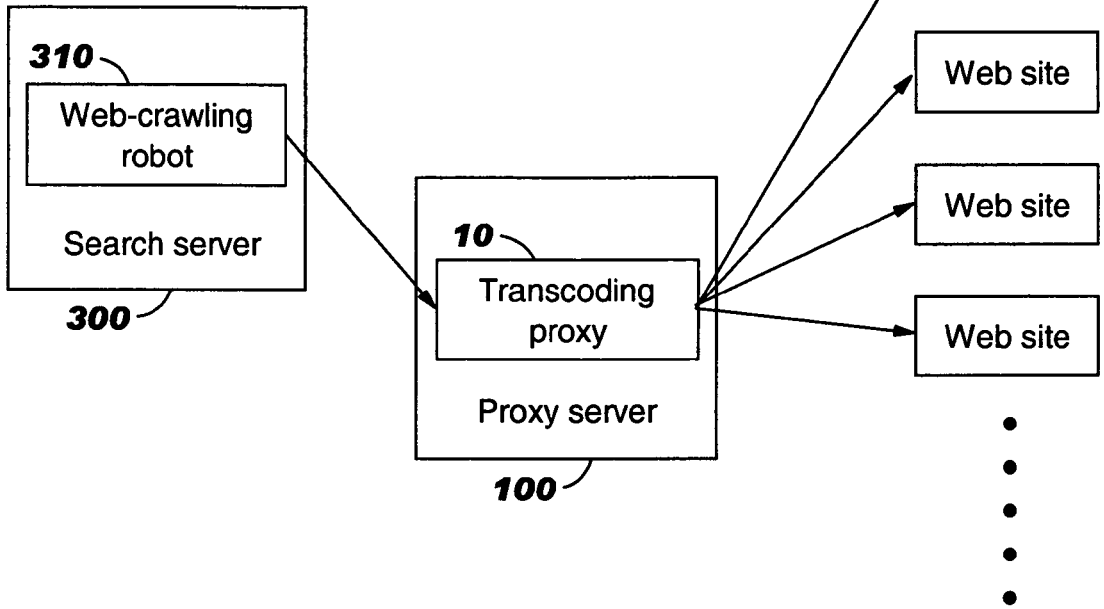
FIG. 3 is a block diagram showing the configuration in which a transcoding proxy of the invention is provided in a predetermined proxy server on the network.
Figure 4:
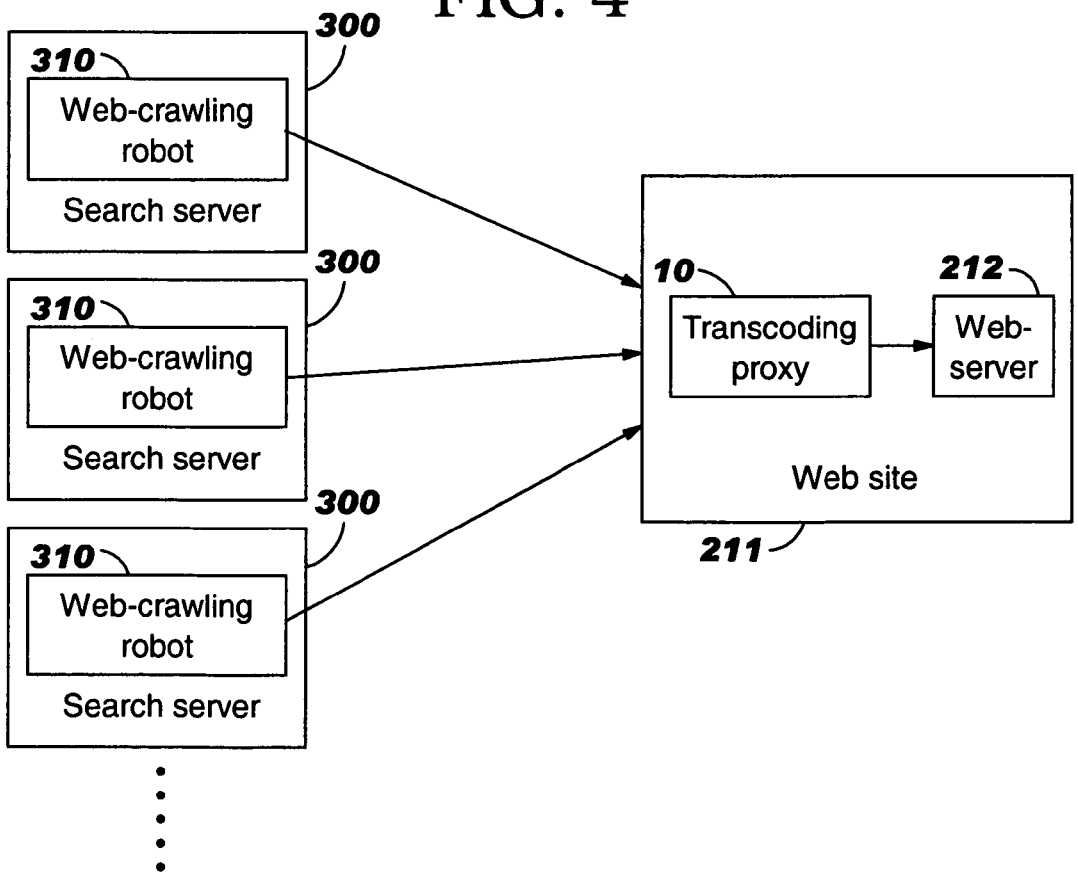
FIG. 4 is a block diagram showing the configuration in which a transcoding proxy of the invention is provided with a site in a content server.

FIGS. 2 to 4 are diagrams that help explain aspects of exemplary embodiments of the invention.

In the example of FIG. 2, the transcoding proxy 10, together with the web-crawling robot 310, is provided in a search server 300 (i.e., the server providing the functions at a search site). In this configuration, the web-crawling robot 310 accesses each site 210 on a network via the transcoding proxy 10.

In the example of FIG. 3, the transcoding proxy 10 is independently provided in a proxy server (intermediate site) 100 on the network. In this configuration, the web-crawling robot accesses the intermediate site and via the transcoding proxy 10 to each web site 210.

In the example of FIG. 4, the transcoding proxy 10, together with the web server 212, is provided in a web site 211. In this configuration, each web-crawling robot 310 on the network gains access to the site 212 in the web site 211 via the transcoding proxy 10.

Figure 5:
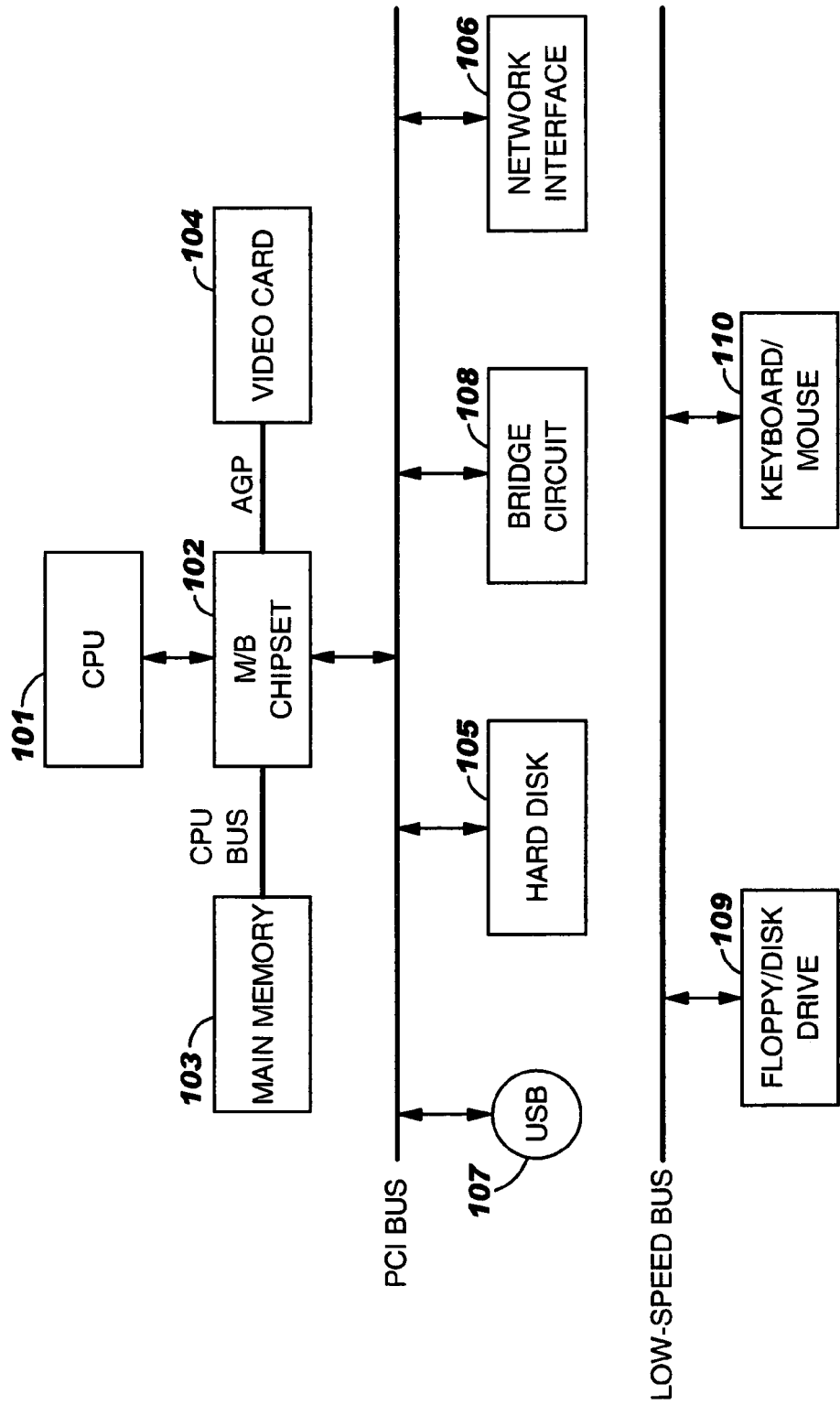
FIG. 5 is a block diagram showing a typical example of the hardware configuration of a computer apparatus suitable for implementing a server with the transcoding proxy according to an embodiment of the invention.

FIG. 5 is a block diagram showing a typical example of the hardware configuration of a computer apparatus suitable for implementing the servers (search server 300, proxy server 100 and content server 200) with the transcoding proxy as shown in FIGS. 2 to 4.

The computer apparatus shown in FIG. 5 comprises a CPU (Central Processing Unit) 101 as operation means, a main memory 103 connected via an M/B (Mother Board) chip set 102 and a CPU bus to the CPU 101, and a video card 104 connected via the M/B chip set 102 and an AGP (Accelerated Graphics Port) to the CPU 101, a hard disk 105, a network interface 106 and a USB port 107 connected via a PCI (Peripheral Component Interconnect) bus to the M/B chip set 102, and a floppy disk drive 109 and a keyboard/mouse 110 connected via the PCI bus, a bridge circuit 108 and a low speed bus such as an ISA (Industry Standard Architecture) bus to the M/B chip set 102.

FIG. 5 is illustrative rather than limiting of the hardware configuration of the computer apparatus for realizing the invention. Various other configurations may be suitable as well. For example, instead of the video card 104, a video memory may be included to process the image data in the CPU 101, or a CD-ROM (Compact Disc Read Only Memory) or DVD-ROM (Digital Versatile Disc Read Only Memory) drive may be provided via the interface such as ATA (AT Attachment).

In the following embodiment, the world wide web and Internet will be used to illustrate aspects of the invention. That is, at the site 210 of FIG. 1, various kinds of web content (e.g., a Web page or its object) are held. The web-crawling robot 310 sends an HTTP request to the site 210, and receives an HTTP response therefrom. In this embodiment, the site 210 may be an ordinary web site, and the web-crawling robot 310 may be the ordinary web-crawling robot that is conventionally employed for web search.

Figure 6:
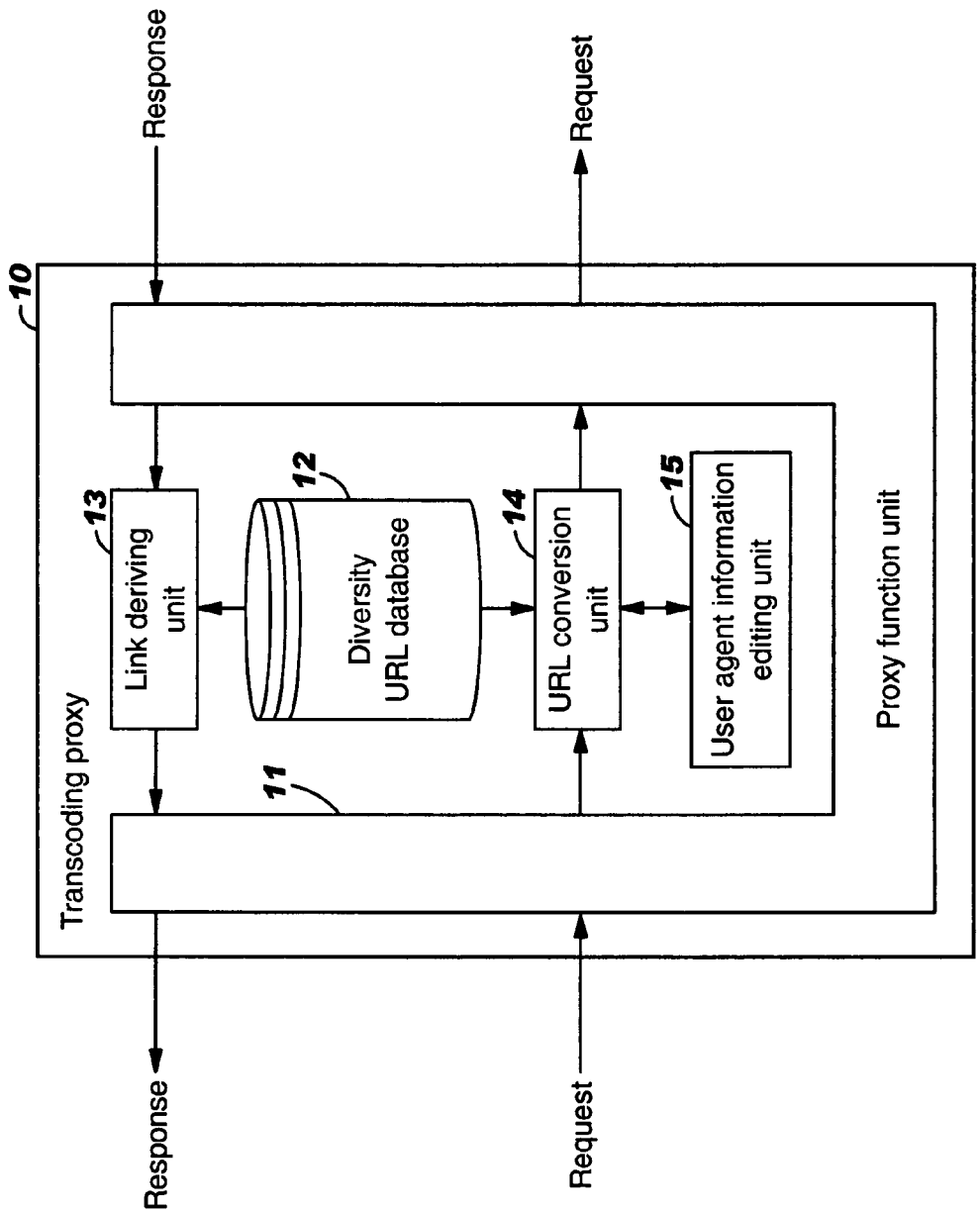
FIG. 6 is a block diagram showing an exemplary functional configuration of the transcoding proxy according to the invention.

FIG. 6 is a block diagram showing an exemplary functional configuration of the transcoding proxy 10. As shown in FIG. 6, the transcoding proxy 10 comprises a proxy function unit 11 for intermediating a request (HTTP request) from the web-crawling robot 310 to the site 210 and a response (HTTP response) from the site 210 to the web-crawling robot 310, a diversity URL database (DB) 12 for registering and holding the information of the site 210 for dynamically creating the content according to the type of client device or URL of content dynamically created (hereinafter referred to as a diversity URL), a link deriving unit 13 as analysis means for deriving a link of the content included in the response sent from the site 210, a URL conversion unit 14 as editing means for converting a destination URL for a request sent from the web-crawling robot 310, and a user agent information editing unit 15 for editing the information of user agent in the request.

The link deriving unit 13, the URL conversion unit 14, and the user agent information editing unit 15 may be a virtual software block that is implemented by controlling the CPU 101 with a program expanded in the main memory 103 as shown in FIG. 5. The program for implementing these functions by controlling the CPU 101 may be provided by way of a magnetic disk, an optical disk, a semiconductor memory, or any other storage medium, or distributed via the network. In this embodiment, the program is input via the network interface 106 or the floppy disk drive 109 as shown in FIG. 5, or the CD-ROM drive, not shown, and stored on the hard disk 105.

The program stored on the hard disk 105 is read into the main memory 103, expanded and executed by the CPU 101 to implement these functions.

The diversity URL database 12 may be implemented by the main memory, the hard disk 105, and the CPU 101 controlled by the program, as shown in FIG. 5. Also, the proxy function unit 11 may be implemented by the network interface 106 and the CPU 101 controlled by the program, as shown in FIG. 5.

In the above configuration, the proxy function unit 11 accepts a request from the web-crawling robot 310, processes it in the URL conversion unit 14 and the user agent information editing unit 15, and then sends the processed request to the site 210. Also, the proxy function unit 11 accepts a response from the site 210, processes it in the link deriving unit 13, and sends the processed response to the web-crawling robot 310.

The diversity URL database 12 registers the diversity URL that is the URL information of content, as well as the user agent information designating the type of client device to be identified in terms of this diversity URL, namely, corresponding to the content (or site) designated by the diversity URL, and substitute URL individually corresponding to the client device designated by this user agent information.

The data format of the diversity URL may be a variable length character string. The data format of the user agent information may be a variable length character string, and may have a value (User-Agent value) described in a User-Agent HTTP header of the HTTP request. The data format of the substitute URL may be a variable length character string, and may have the URL of the content (or site) individually corresponding to the client device designated by the user agent information.

FIG. 7 is a table showing exemplary information (registered values) registered in the diversity URL database 12. As shown in FIG. 7, the diversity URL "www.cp_X.com/page_1.html" corresponds to two client devices, device A and device B, with two substitute URLs "www.cp_X.com/page_1.html.for.device_A" and "www.cp_X.com/page_1.html.for.device_B" registered corresponding to the user agent information.

The above information is acquired in advance from the site 210 or its administrator, and registered. If the diversity URL is newly set up, the information regarding the diversity URL is supplied from the site 210 or its administrator and additionally registered. Also, when the types of corresponding client devices are increased or changed at the site 210 of the diversity URL, the new user agent information is supplied and the registration content is updated.

Further, control means of the diversity URL database 12 has a link expansion list acquiring function, a URL conversion function, and a user agent information acquiring function as the access functions used by the link deriving unit 13, the URL conversion unit 14 and the user agent information editing unit 15, respectively.

The link expansion list acquiring function is employed for reference by the link deriving unit 13. If the original URL is passed as the argument, a record with a matched column value is selected from the table as shown in FIG. 7, and the list of corresponding user agent information and substitute URL is returned.

The URL conversion function is employed for reference by the URL conversion unit 14. If a substitute URL is passed as the argument, a record with a matched column value is selected from the table as shown in FIG. 7, and the corresponding original URL (diversity URL) is returned.

The user agent information acquiring function is employed for reference by the user agent information editing unit 15. If a substitute URL is passed as the argument, a record with a matched column value is selected from the table as shown in FIG. 7, and the corresponding user agent information is returned.

The link deriving unit 13 analyzes a response sent from the site 210, detects the diversity URL from the link included in the response, and expands the link into the link (hereinafter referred to as a dummy link) for each corresponding user agent (client device). For example, consider an instance where there is the link to the dynamic content corresponding to two client devices of device A and device B in the web page sent as a response from the site 210. In this instance, the diversity URL database 12 is retrieved using the link expansion list acquiring function, with the URL that is the link destination of the link as the argument. When the URL of the link is present (or hit) in the diversity URL, the user agent information of device A and device B registered in the diversity URL database 12 and the substitute URL is read out to replace the URL in the link. Thereby, the link is replaced with the dummy link.

Figure 8:
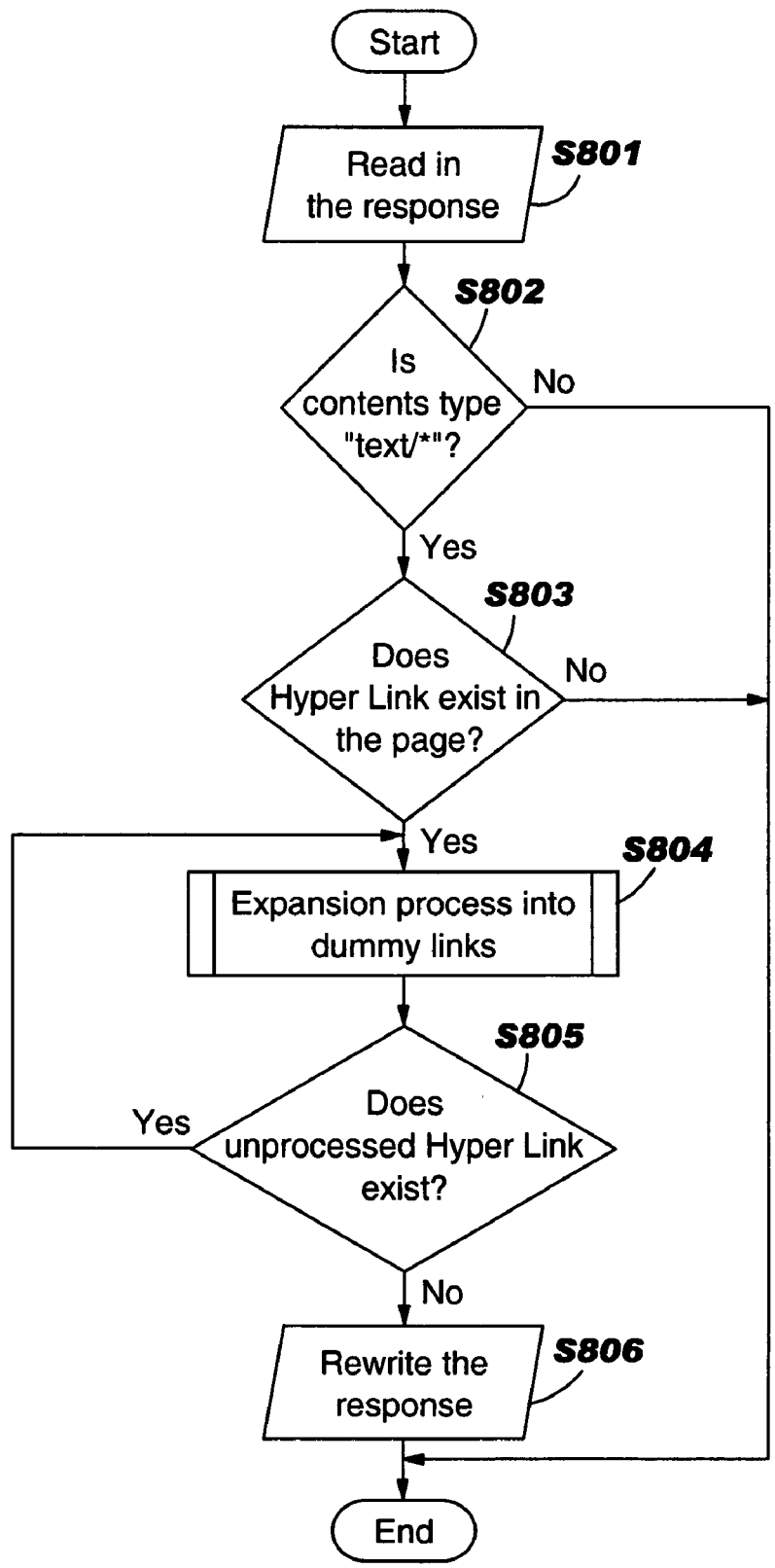
FIG. 8 is a flowchart for explaining the operation of a link deriving unit in accordance with the invention.

FIG. 8 is a flowchart for explaining the operation of the link deriving unit 13. As shown in FIG. 8, if the proxy function unit 11 receives a response from the site 210, the link deriving unit 13 reads the header part and the body part of the response, and stores them in a work area of the main memory 103 (step 801). A determination is made as to whether or not the data type of the body part is text, on the basis of the Content-Type of the read header information (step 802).

If the data type of the body part in the response is text, the link deriving unit 13 checks whether or not the link (hyperlink) is in the body part (web page) (step 803). The presence or absence of the link is checked by detecting a tag such as an anchor tag "<a>" or a form tag "<form>" bearing the link. If the link exists, an expansion process for deriving the link into dummy links with substitute URLs is performed (step 804). The details of this link expansion process will be described later, with reference to FIG. 9.

After the deriving process is completed for all the links present in the body part, the link deriving unit 13 rewrites the response received from the site 210 on the basis of the edit result from the expansion process (steps 805 and 806). The proxy function unit 11 sends the rewritten response to the web-crawling robot 310.

If the data type of the body part in the response is not text, as determined at step 802, and no link is found in the body part at step 803, the proxy function unit 11 directly sends the response received by the proxy function unit 11 to the web-crawling robot 310.

Figure 9:
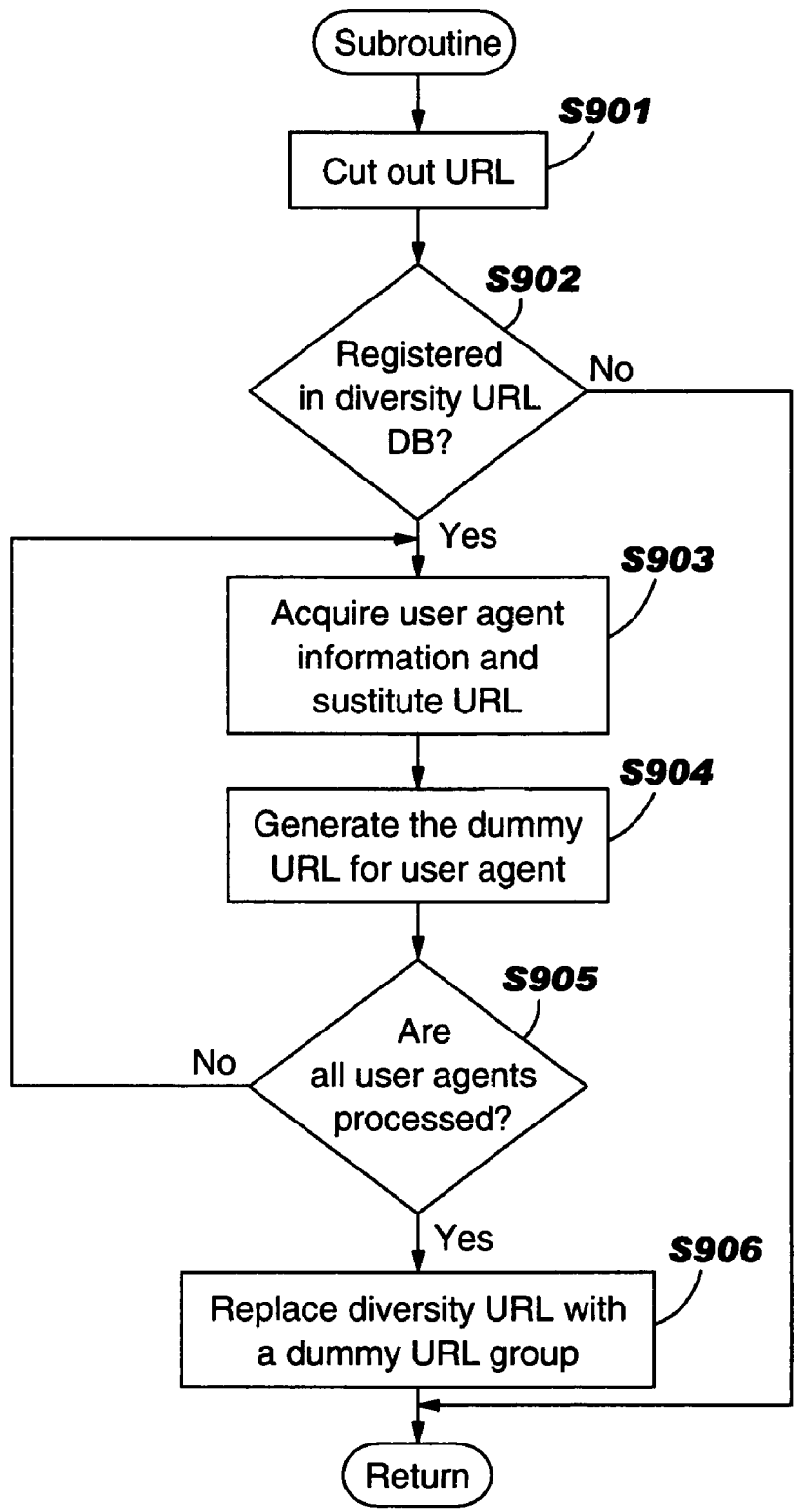
FIG. 9 is a flowchart for explaining the details of an expansion process into a dummy link of FIG. 8.

FIG. 9 is a flowchart for explaining in detail the deriving process into dummy links at step 804 in FIG. 8. For each link detected at step 803, the process of FIG. 9 is performed. First, the link deriving unit 13 removes the URL of link destination from the tag such as the anchor tag "<a>" and form tag "<form>" bearing the link, and stores it in a work area of the main memory 103 as shown in FIG. 5 (step 901). A determination is made as to whether or not the removed URL is registered in the diversity URL database 12 (step 902). For this process, the link expansion list acquiring function is employed.

When the URL removed from the link is registered in the diversity URL database 12, the link deriving unit 13 acquires the list of the user agent information of each user agent corresponding to the URL and the substitute URL (step 903). The dummy URL is generated on the basis of the substitute URL (step 904). The dummy URL is the substitute URL of the corresponding user agent registered in the diversity URL database 12, with the user agent proper information (screen display size, color tone, and so on) added. Accordingly, since the dummy URL includes the substitute URL, the substitute URL is dealt with as the dummy URL in the following description, unless specifically required.

The additional information added to the substitute URL may be described by defining an HTTP extension header in the content individually corresponding to the user agent, and acquired by reading it from the extension header. If the substitute URL with user agent proper information included is defined and registered in the diversity URL database 12, the substitute URL read from the diversity URL database 12 is directly the dummy URL, without need of generating the dummy URL in the link deriving unit 13.

After the dummy URLs regarding all the user agents corresponding to the URL (hereinafter referred to as original URL) removed from the link are generated, the link deriving unit 13 replaces the original URL stored in the work area of the main memory 103 with a group of dummy URLs generated, whereby the expansion process into dummy links is ended (steps 905 and 906). At this time, the operation returns to the main process (FIG. 8) with the return code set at a return value of "normal end." The link destination URL described in the response will then be replaced with a group of dummy URLS, as described above (see step 806).

On the other hand, if the URL removed from the link is not registered in the diversity URL database 12 as a result of the processing at step 902, the operation is directly ended, because it is unnecessary to expand the link. At this time, the operation returns to the main process (FIG. 8) with the return code set at a return value of "unnecessary processing."

In the above manner, if the response from the site 210 includes the link to the diversity URL dependent on the type of user agent, this link is expanded into dummy links of corresponding individual user agents (i.e., the original URL (diversity URL) of link destination is replaced with the group of dummy URLs). The response with the expanded links included is sent to the web-crawling robot 310.

If the request sent from the web-crawling robot 310 is issued on the basis of the dummy link replaced by the link deriving unit 13, the URL conversion unit 14 restores the destination of this request (link destination of dummy link) to the original destination. More specifically, the diversity URL database 12 is retrieved by the URL conversion function, with the substitute URL in the dummy URL that is the destination of the request as the argument. The original URL corresponding to the substitute URL and registered in the diversity URL database 12 is read out to replace the destination of the request with the read URL.

If the request sent from the web-crawling robot 310 is issued on the basis of the dummy link replaced by the link deriving unit 13, the user agent information editing unit 15 replaces the user agent information described in the header of this request with the user agent information of the user agent corresponding to the dummy link. More specifically, the diversity URL database 12 is retrieved by the user agent information acquiring function, with the substitute URL in the dummy URL that is the destination of the request as the argument. The user agent information corresponding to the substitute URL and registered in the diversity URL database 12 is read out and written into the User-Agent HTTP header.

Figure 10:
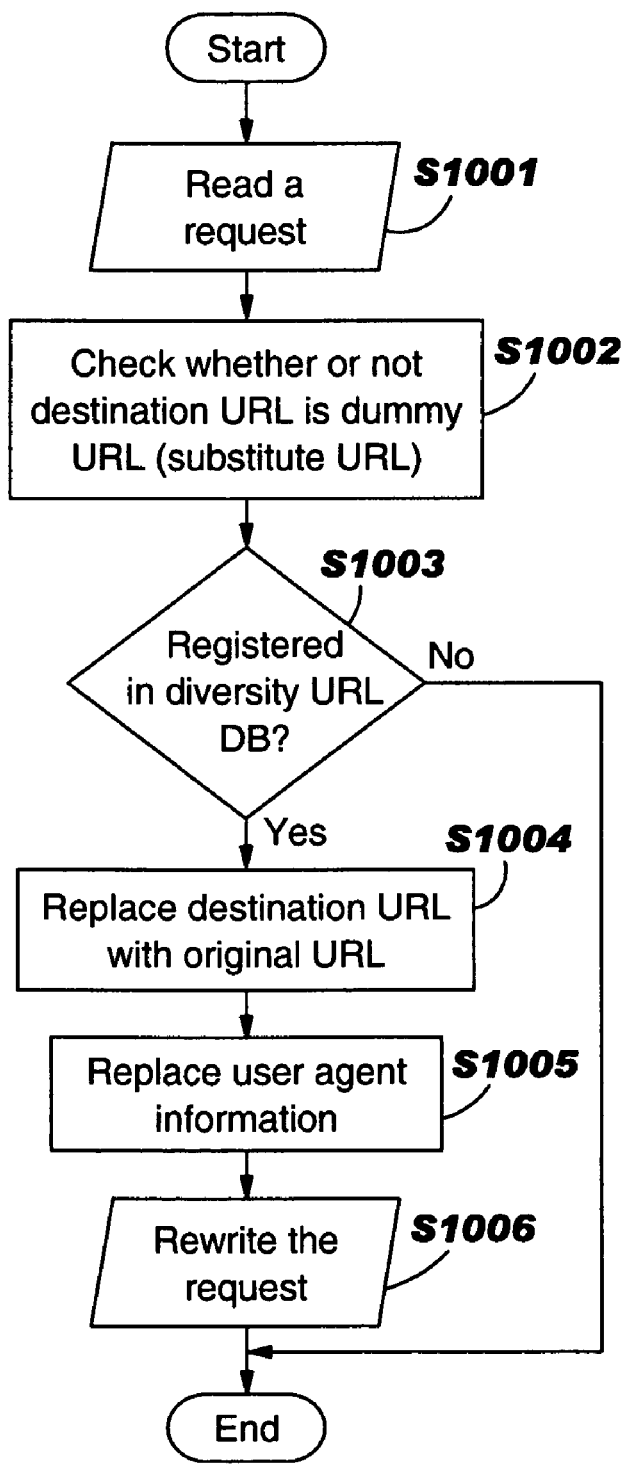
FIG. 10 is a flowchart for explaining the operation of a URL conversion unit and a user agent information editing unit according to the invention.

FIG. 10 is a flowchart that illustrates the operation of the URL conversion unit 14 and the user agent information editing unit 15. As shown in FIG. 10, if the proxy function unit 11 receives a request from the web-crawling robot 310, the URL conversion unit 14 reads the header part and the body part of the request, and stores them in the work area of the main memory 103 as shown in FIG. 5 (step 1001). At this time, the header part of the request is removed, and stored in the work area of the main memory 1003. A determination is made as to whether or not the URL that is the destination in the header part is registered in the diversity URL database 12 by the URL conversion function (step 1002).

If the URL is the dummy URL expanded by the link deriving unit 13, the corresponding original URL is returned, because the URL is registered in the diversity URL database 12. Thus, the URL conversion unit 14 replaces the URL that is the destination in the header part removed from the request stored in the work area of the main memory 103 with the original URL acquired from the diversity URL database 12 (steps 1003 and 1004). The process transfers to the user agent information editing unit 15.

The user agent information editing unit 15 acquires the user agent information corresponding to the dummy URL (substitute URL) using the user agent information acquiring function. The user agent information (indicating that the web-crawling robot 310 is the user agent) included in the header removed from the request stored in the work area of the main memory 103 is replaced with the user agent information acquired from the diversity URL database 12, and the operation returns to the URL conversion unit 14 (step 1005).

The URL conversion unit 14 rewrites the header information (destination and user agent information) of the request received from the web-crawling robot 310 and stored in the work area of the main memory 103 on the basis of the result of the URL conversion process and the editing process of user agent information by the user agent information editing unit 15 (step 1006). The proxy function unit 11 sends the rewritten request to the site 210.

In the above manner, the request from the web-crawling robot 310 disguised as the request from each user agent corresponding to the diversity URL is sent to the site 210. A response individually corresponding to each user agent is returned from the site 210 and accumulated in the search server 300. When the response corresponding to the user agent is received from the site 210 and sent to the web-crawling robot 310, the transcoding proxy 10 embeds the user agent information of the user agent corresponding to the response into the response, employing a meta tag "<meta>", such as "<meta name="keywords" content="devinfo=device_A">" and "<meta name="keywords" content="devinfo=device_B">". Thereby, at the search server 300, the user agent and the response are stored in association. When there is no difference according to the type of user agent (without diversity), the information "<meta name="keywords" content="devinfo=ANY">" is embedded.

The operation of the transcoding proxy 10 according to this embodiment is now described below by way of a specific example.

Figure 11:
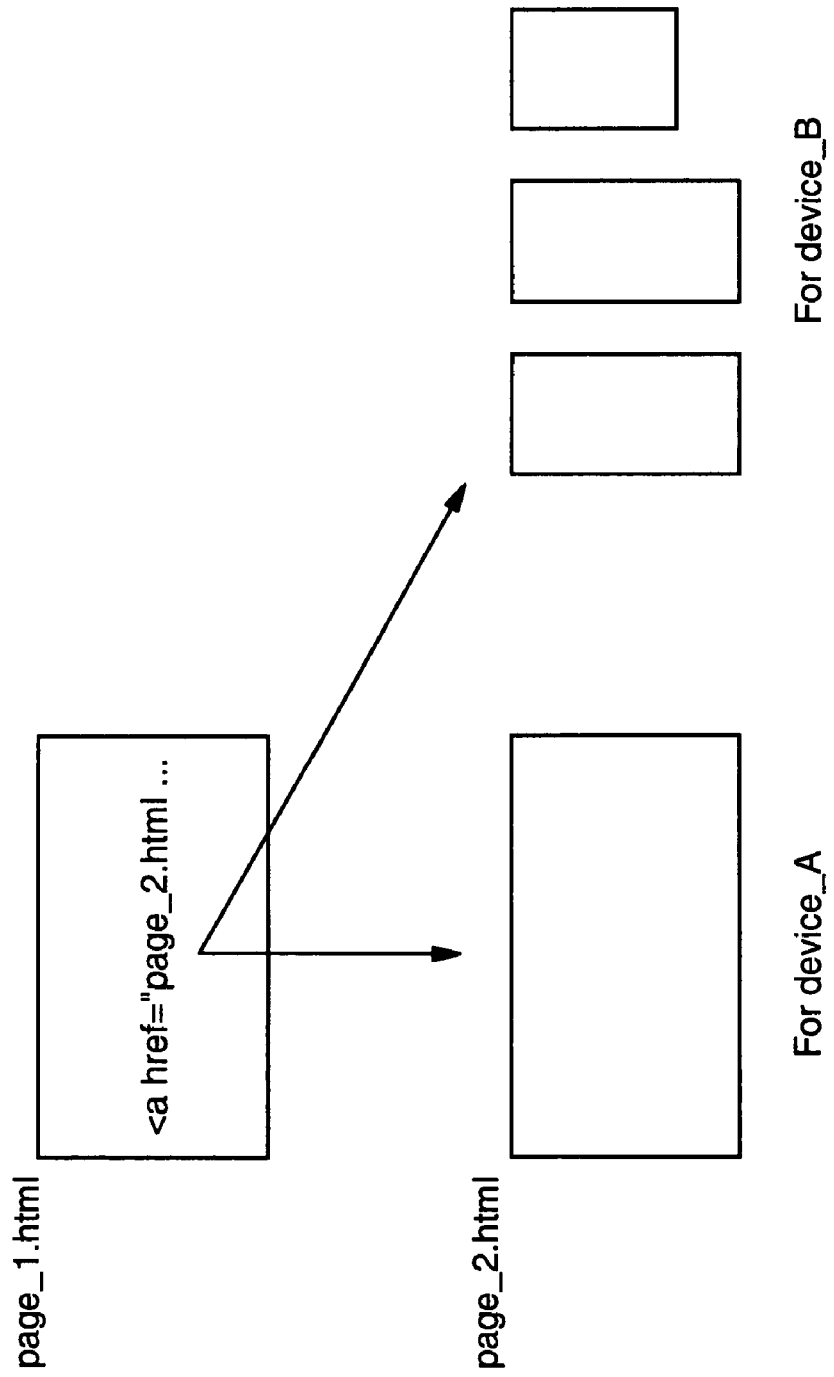
FIG. 11 is a view showing a configuration example of the content collected.

FIG. 11 shows an exemplary configuration of the contents collected in this embodiment. Suppose the content is composed of two web pages (HTML file), page_1.html and page_2.html, as shown in FIG. 11. In this case, page_1.html has a link to page_2.html, and page_2.html is a web page dynamically created corresponding to two types of user agents of device A and device B.

Figure 12:
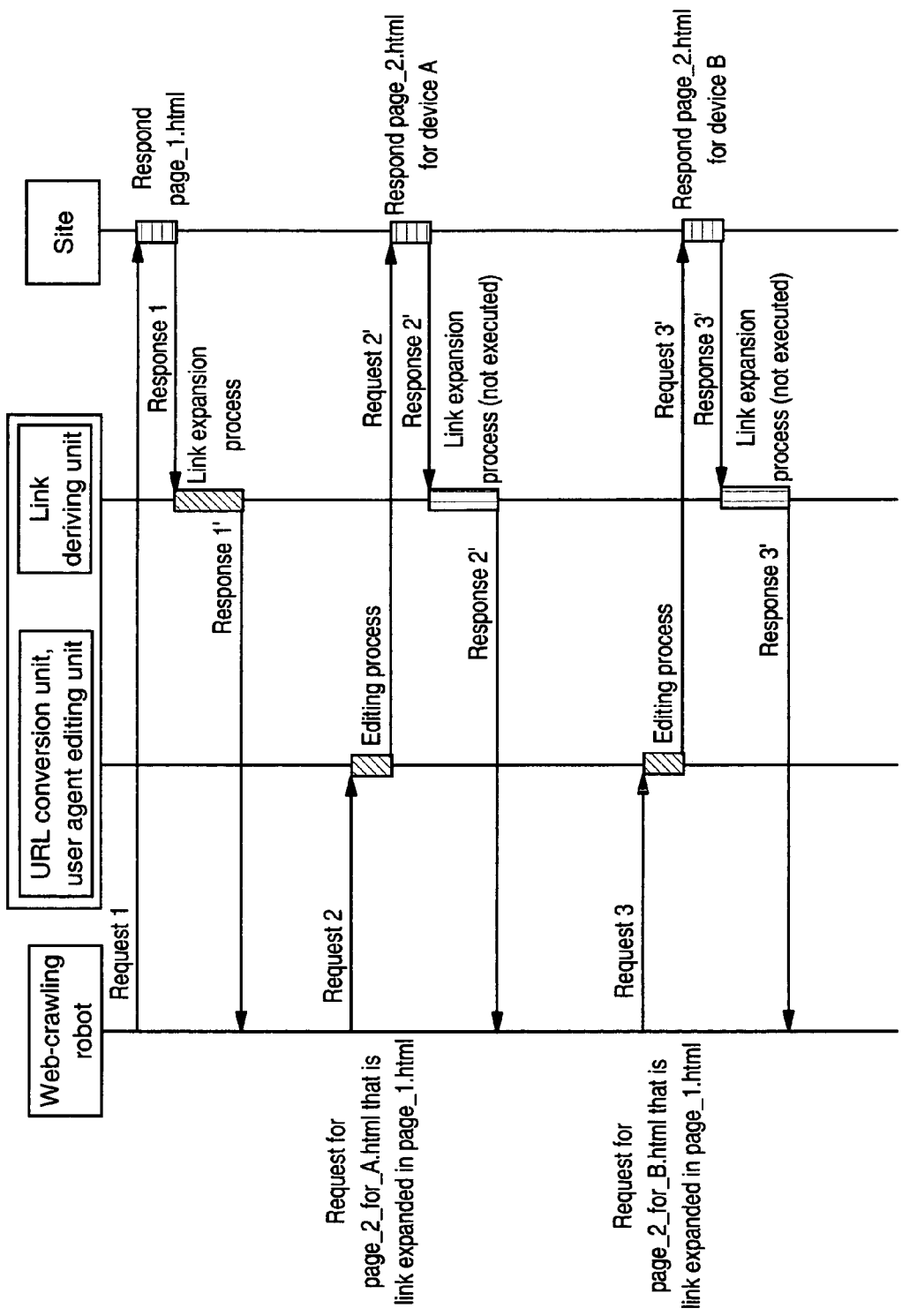
FIG. 12 is a diagram for explaining a process in which a web-crawling robot collects the content information as shown in FIG. 11.

FIG. 12 is an exemplary diagram for explaining the process in which the web-crawling robot 310 collects the content information as shown in FIG. 11. Suppose that the web-crawling robot 310 first issues an acquisition request (request 1) for page_1.html to the site 210, as shown in FIG. 12. Request 1 is sent via the transcoding proxy 10 to the site 210, and the site 210 returns a response 1 to the request 1. The substance of response 1 is page_1.html.

The transcoding proxy 10 processes page__1.html, and because there is a link to page__2.html and because the content of page__2.html depends on the type of user agent (i.e., the URL for page__2.html is the diversity URL), the link deriving unit 13 performs the link expansion process. Thereby, response 1 is converted into response 1' containing the web page having the link to page__2.html corresponding to device A (page__2_for_A.html) and the link to page__2.html corresponding to device B (page__2_for_B.html), and sent to the web-crawling robot 310.

The web-crawling robot 310 issues an acquisition request for page__2_for_A.html and page__2_for_B.html in succession, because the web page that is the substance of the received response 1' has two links to page__2_for_A.html and page__2_for_B.html.

Suppose now that an acquisition request (request 2) for page__2_for_A.html is issued. The transcoding proxy 10 restores the URL that is the destination of request 2 to the original URL, using the URL conversion unit 14 and the user agent information editing unit 15, and converts the user agent value of the HTTP header to the user agent value indicating device A. Thereby, the request 2 is sent 210 by disguising it as the request issued from device A (request 2'). The site 210 returns a response 2' containing the content page__2.html for device A upon this request 2'.

In the example of FIG. 11, the link expansion process for the response 2' is not performed in the transcoding proxy 10, because page__2.html includes no link to the diversity URL, whereby the response 2' with user agent information for indicating the response corresponding to device A added in meta tag is sent to the web-crawling robot 310.

Then, the web-crawling robot 310 issues an acquisition request for page__2_for_B.html (request 3), and through the same process, a response 3' corresponding to device B is returned to the web-crawling robot 310.

Figure 13:
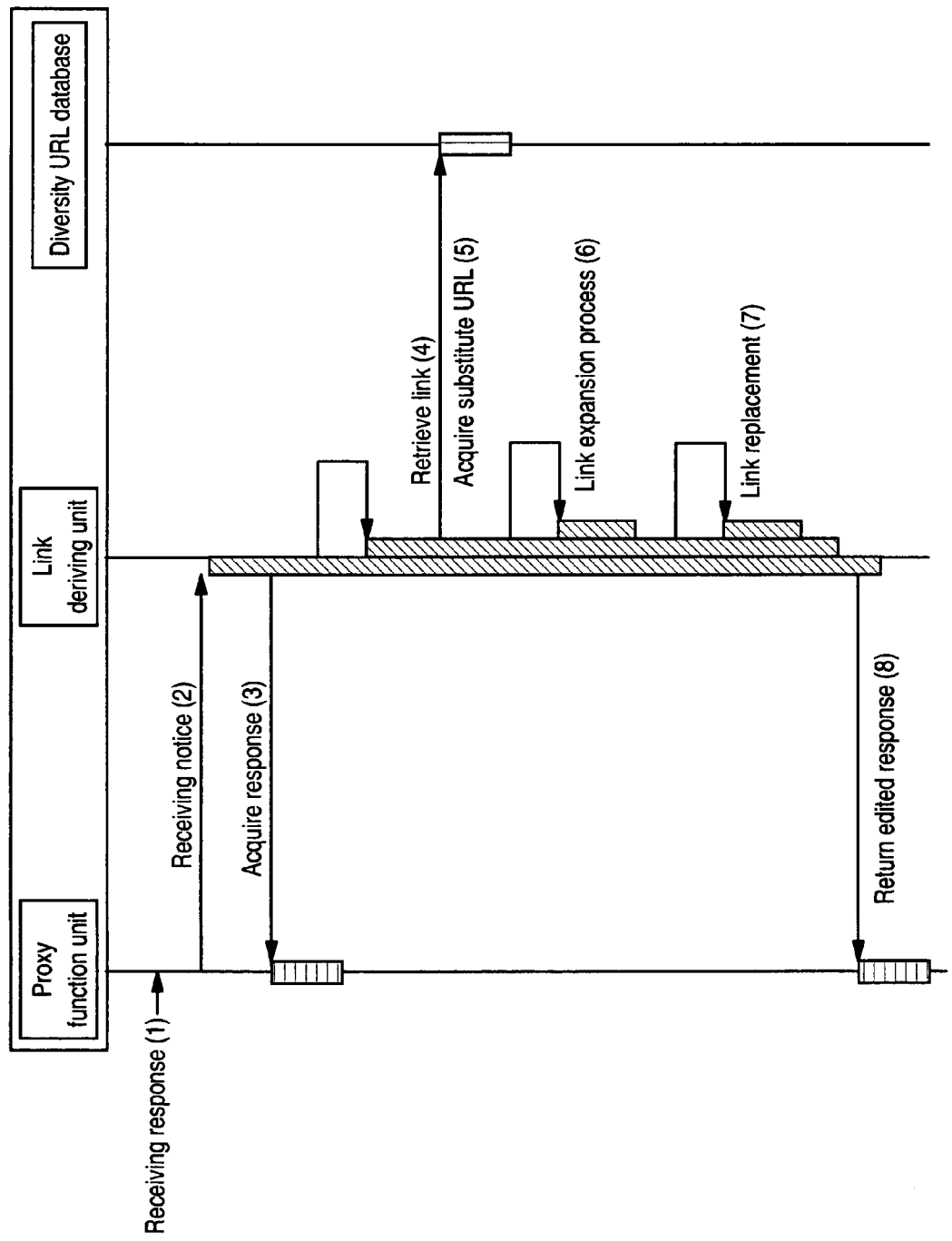
FIG. 13 is a diagram for explaining a process for making the link expansion to a response from the site to the web-crawling robot.

FIG. 13 is an exemplary diagram regarding a process for making the link expansion to a response from the site 210 to the web-crawling robot 310. As shown in FIG. 13, the proxy function unit 11 of the transcoding proxy 10 receives a response sent from the site 210 (1), then sends a receiving notice to the link deriving unit 13 (2), and acquires the response from the link deriving unit 13 (3). The link in the body part of the response is retrieved (4). The obtained link is held in the work area of the main memory 103 as shown in FIG. 5.

The link deriving unit 13 searches the diversity URL database 12 with the URL (original URL) at the link destination of the link present in the body part of the response to acquire the substitute URL for each user agent corresponding to the original URL (5). The link expansion process is performed for generating the dummy URL including the acquired substitute URL and replacing the original URL held in the work area of the main memory 103 with the substitute URL (6). At this time, when there is no link to the content returning the response individually corresponding to the type of user agent (there is only the link to the content returning the uniform response irrespective of the type of user agent), the substitute URL is not acquired, and the link expansion process is not performed, because the corresponding URL is not registered in the diversity URL database 12.

Finally, the link deriving unit 13 rewrites the URL (original URL) described in the body part of the response into the group of dummy links replaced in the work area of the main memory 103 (7), and returns the edited response to the proxy function unit 11 (8). The proxy function unit 11 sends the edited response to the web-crawling robot 310.

Figure 14:
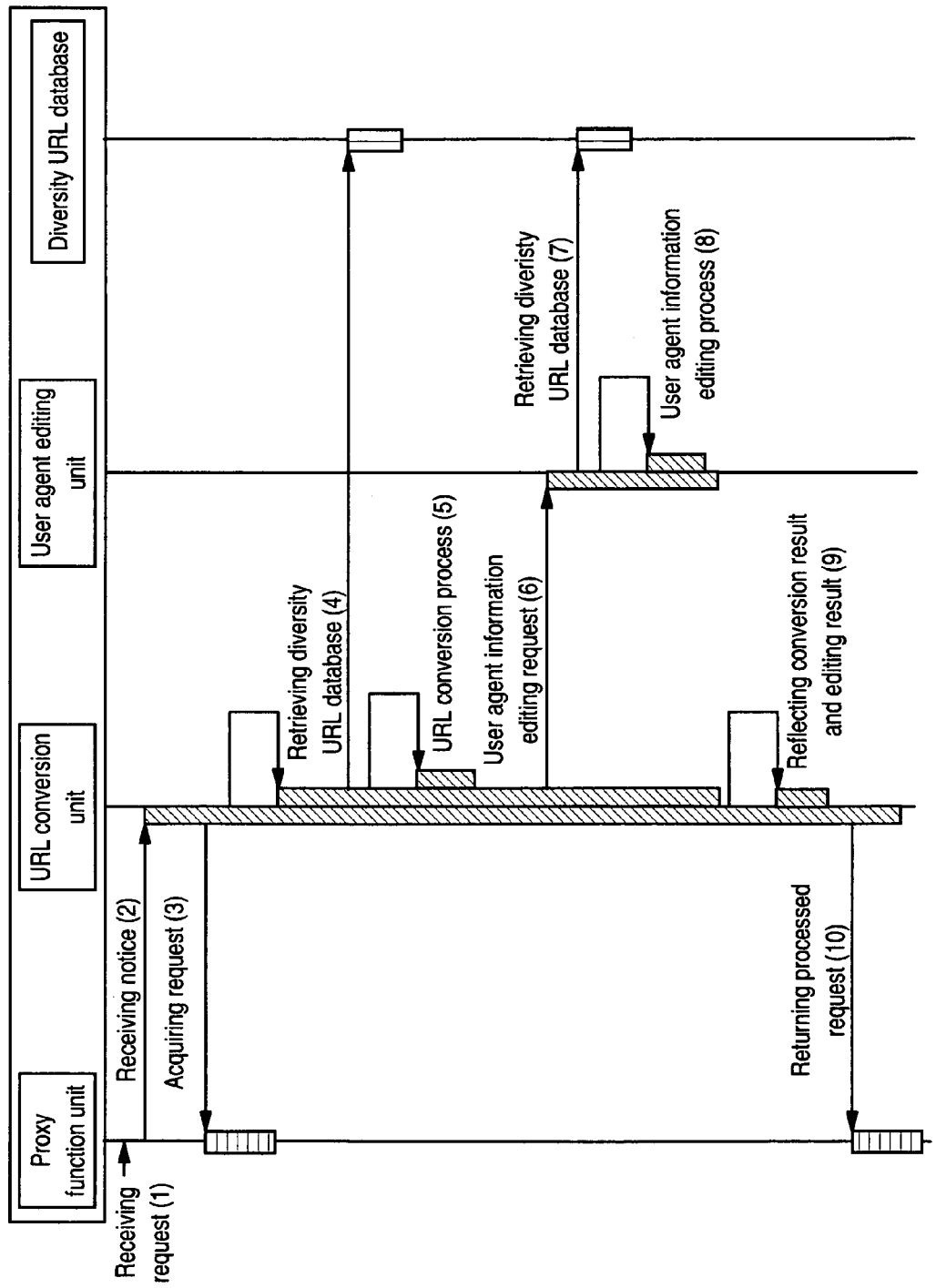
FIG. 14 is a diagram for explaining a process with data flow for making a request from the web-crawling robot to the site.

FIG. 14 is a diagram regarding a process for making a request from the web-crawling robot 310 to the site 210. As shown in FIG. 14, the proxy function unit 11 of the transcoding proxy 10 receives a response sent from the web-crawling robot 310 (1), then sends a receiving notice to the URL conversion unit 14 (2), and acquires a request from the URL conversion unit 14 (3). The diversity URL database 12 is retrieved with the URL at the destination of the request as the argument (4). If the URL at the destination is the dummy URL generated in the previous link expansion process, the corresponding original URL is returned, because the substitute URL is registered in the diversity URL database 12.

If the original URL is returned from the diversity URL database 12, the URL at the destination is converted into the original URL in the work area of the main memory 103 (5). The operation transfers to the user agent information editing unit 15 (6).

The user agent information editing unit 15 retrieves the diversity URL database 12 with the URL at the destination of the request as the argument (7). An editing process is performed for acquiring the user agent information of the corresponding user agent and converting the user agent information included in the header information of the request into the acquired user agent information on the work area of the main memory 103 (8).

Thereafter, the URL conversion unit 14 reflects the conversion of the URL and the conversion of the user agent information in the work area of the main memory 103 to the header part of the request received from the web-crawling robot 310 (9), and returns the processed request to the proxy function unit 11 (10). This processed request is sent from the proxy function unit 11 to the site 210.

Through the above operation, the web-crawling robot 310 acquires the response according to the type of each corresponding user agent from the site 210, which site responds with different substance according to the type of user agent. The search server (search site) 300 having the web-crawling robot 310 creates the index information used for searching from the content collected in this manner and registers it in the database. The index information includes the information indicating the type of user agent corresponding to the location information of content and the information of text in the content.

Figure 15:
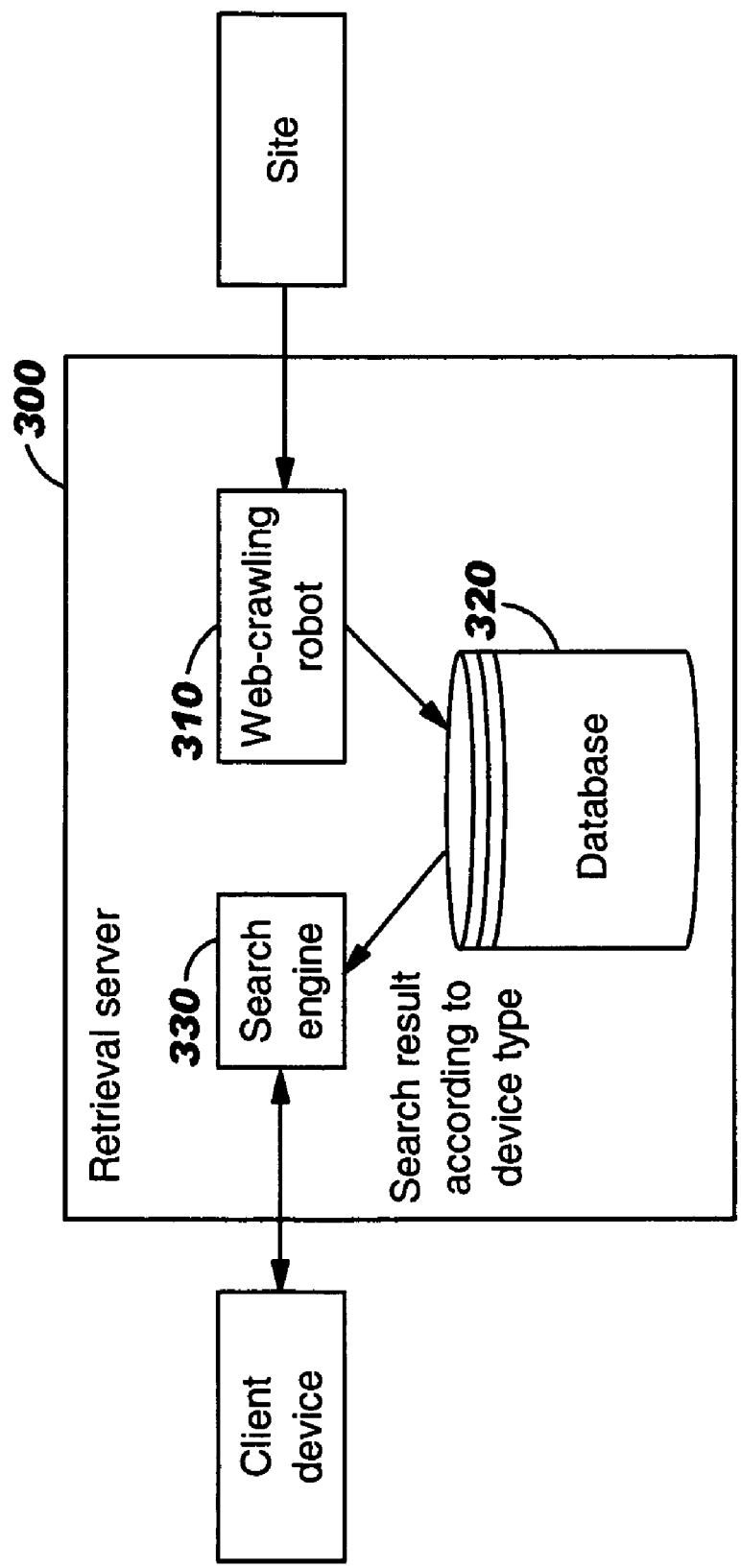
FIG. 15 is a block diagram schematically showing the configuration of a search server.

FIG. 15 is an exemplary block diagram schematically showing a suitable configuration of the search server 300. As shown in FIG. 15, the search server 300 comprises the web-crawling robot 310, the database 320 for storing the index information for searching information, and the search engine 330 for retrieving the database 320. Transmitter-receiver means for accepting a search request from the client device (user agent) via the network and returning the search result through the search engine 330 is provided, although not explicitly shown in the figure. The database 320 stores the index information created from the contents collected by the web-crawling robot 310, as described above. In this embodiment, the transcoding proxy 10 embeds the user agent information in the response from the site 210, employing meta tag "<meta>", whereby the index information may include the information indicating the association of the index information with the user agent.

Figure 16:
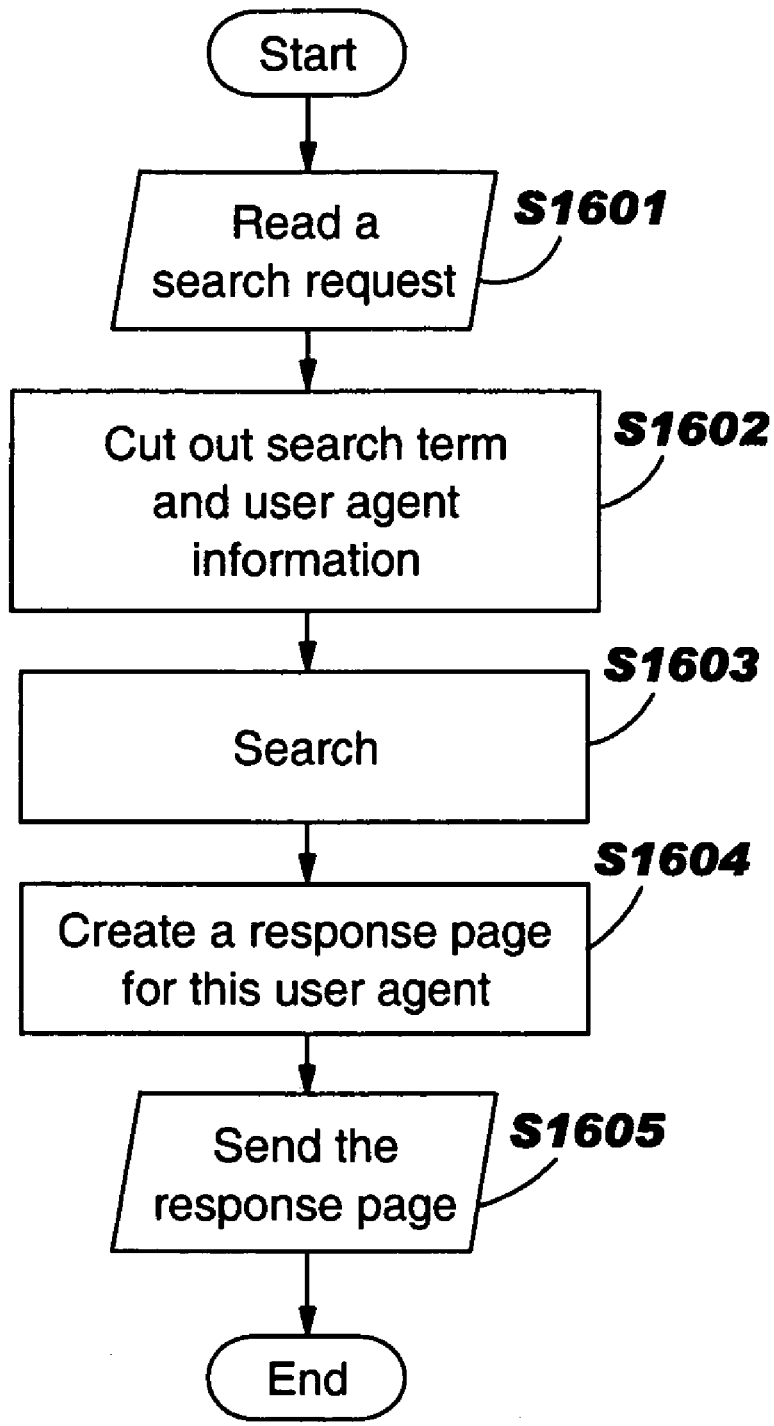
FIG. 16 is a flowchart for explaining the operation of a search engine when accepting a search request from the client device.
Figure 17:
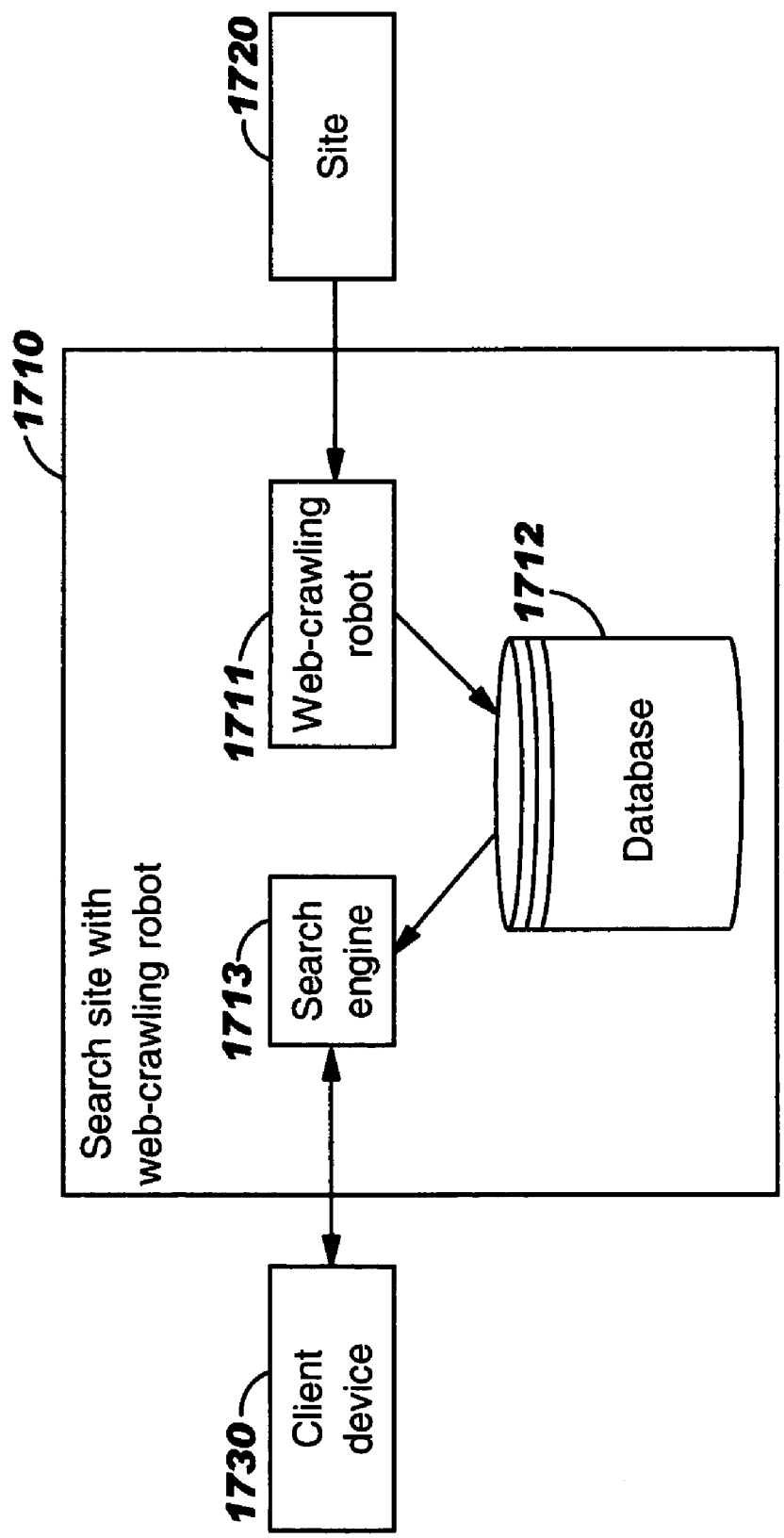
FIG. 17 is a block diagram showing the schematic configuration of a robot type search site.

FIG. 16 is a flowchart for explaining the operation of the search engine 330 when accepting a search request from the predetermined client device (user agent). The predetermined client device sends a search request to the search server 300. The HTTP header or extension header of this search request stores the search term (keyword) and the user agent information.

As shown in FIG. 16, the search request from the client device is received and read (step 1601). Then, the search engine 330 removes the search term (keyword) in the input search request and the user agent information (step 1602). The database 320 is searched by extracting the content under the constraint conditions of this information (step 1603). That is, the database 320 is retrieved in the search term by extracting the content with character string "devinfo=user agent information" or "devinfo=ANY" included in the keywords information of the meta tag.

Then, the search engine 330 creates a response page describing the search result in a predetermined format (step 1604), and returns the response page to the client device making the search request (step 1605).

In the above manner, the client device obtains the search result suitable for itself from the search server 300. This search result is obtained by extracting the content from among the contents retrievable by the search server 300, and therefore includes the information of content created appropriately for each device. Thus, as described above, the invention enables a site to acquire information on contents classified by type of corresponding terminal if the site dynamically creates the content and returns an individual response according to the type of client device, when a web-crawling robot collects information.

What is claimed is:

1. A server, comprising:
a proxy function unit for relaying data exchanged between a web sewer site on a network and a web-crawling robot collecting contents by accessing the site;
a link deriving unit for expanding a link if the link is included in a database that associates and registers location information of the collected contents and acquiring information on a user agent corresponding to content of a link destination when said proxy function unit receives a response from the site to a content retrieval request issued from said web-crawling robot to said site, wherein the link deriving unit expands the link by acquiring from the database a list of the user agent information of each user agent corresponding to the link; and
a user agent information editing unit, wherein the user agent information editing unit is used if a link destination of the link included in the response has dynamic content that differs according to a type of user agent which is an access source, and wherein the user agent information editing unit is further used for converting user agent information included in the content retrieval request to user agent corresponding to said content of the link destination to disguise the content retrieval request to be issued from the user agent, when said proxy function unit receives the content retrieval request from said web-crawling robot issued based on derived links.

2. The server according to claim 1, further comprising a database for associating and registering location information of content that varies according to the type of accessing user agent and the user agent information corresponding to said content, wherein said link deriving unit searches said database using the location information of the link destination of the link included in the response as an argument to acquire the information for said user agent, and said user agent information editing unit converts the user agent information included in said content retrieval request to said user agent information obtained from said database.

3. The server according to claim 1, wherein said server is included in a server machine that hosts the web-crawling robot.

4. The server according to claim 1, wherein said server is included in a server machine that hosts the web server site.

5. The server according to claim 1, wherein said server is provided on a different server machine from the server hosting said web-crawling robot and the server hosting said web server site.

6. A server, comprising:
first transmitter-receiver means for exchanging data with a web-crawling robot collecting contents by accessing a web site;
link expansion means for expanding a link if the link is included in a database that associates and registers location information of the collected contents and acquires information on a user agent corresponding to content of a link destination when said first transmitter-receiver means receives a response from the site to a content retrieval request issued from said web-crawling robot to said sit, wherein the link deriving unit expands the link by acquiring from the database a list of the user agent information of each user agent corresponding to the link;
editing means for disguising user agent information included in a request from said web-crawling robot to the web site, received by said first transmitter-receiver means, as a content retrieval request issued by a given user agent; and
second transmitter-receiver means for exchanging data with said site and sending user agent information disguised by said editing means to said destination site.

7. The server according to claim 6, further comprising analysis means for analyzing a response from said site to said web-crawling robot, received by said second transmitter-receiver means, wherein said editing means designates the given user agent on the basis of the information analyzed by said analysis means and converts the user agent information of said content retrieval request to the user agent information of said given user agent.

8. The server according to claim 7, when said analysis means replaces link destination information of a hyperlink with dummy information including identification information for identifying the user agent corresponding to the content of the link destination to cause said first transmitter-receiver means to send the hyperlink to said web-crawling robot, if the link destination of the link included in the response has content that varies according to a type of user agent which is an access source,
and said editing means restores said dummy information to original link destination information, when said first transmitter-receiver means receives a content retrieval request issued from said web-crawling robot with said dummy information as a destination, and converts the user agent information included in said content retrieval request to the user agent information of the user agent designated by said identification information including in said dummy information.

9. A server, comprising:
a proxy function unit for relaying data exchanged between a web site on a network and a web-crawling robot collecting information by accessing the web site;
a link deriving unit for replacing uniform resource locators (URLs) of a destination of a link included in a response, from the web site to a content retrieval request issued from said web-crawling robot, with substitute URLs individually corresponding to said user agent corresponding to a web content concerned when said proxy function unit receives a response from the web site and if the link destination of the link included in the response has web content that varies according to a type of user agent which is an access source and if the link is included in a database that associates and registers location information of the content and the information on said user agent corresponding to said content;

a URL conversion unit for replacing the substitute URL with the original URL of the link destination when said proxy function unit receives a content retrieval request issued from said web-crawling robot to said substitute URL as a destination, wherein the substitute URL is replaced with the original URL of the link destination by acquiring from the database a list of the user agent information of each user agent corresponding to the link; and a user agent information editing unit for converting user agent information in a hypertext transfer protocol header of the content retrieval request to said user agent information corresponding to the substitute URL to disguise the content retrieval request to be issued from the user agent, when said proxy function unit receives the content retrieval request to said alternate URL as a destination.

10. The server according to claim 9, further comprising a database for associating and registering a URL of web content that individually returns different responses according to the type of user agent which is the access source, the user agent information corresponding to said web content, and a substitute URL individually corresponding to said user agent, wherein:

said link deriving unit searches said database to acquire said substitute URL, using, as a search argument, the URL of the link destination of the link included in the response from said web site to a content retrieval request from said web-crawling robot;

said URL conversion unit searches said database to acquire the URL of the original link destination using, as a search argument, said substitute URL in the content retrieval request issued from said web-crawling robot to said substitute URL as the destination; and said user agent information editing unit searches said database with said substitute URL in the content retrieval request issued from said web-crawling robot to said substitute URL as the destination to acquire the corresponding information of said user agent.

11. A method of collecting information from a web site on a network by using a computer connected thereto, comprising:

receiving a response from the site to a content retrieval request and, if a link destination of a link included in the received response has content that varies according to a type of user agent which is an access source and the link is included in a database that associates and registers location information of the content and the information on said user agent corresponding to said content, expanding the link and acquiring information on a user agent corresponding to the content of the link destination, wherein the link deriving unit expands the link by acquiring from the database a list of the user agent information of each user agent corresponding to the link;

sending a content retrieval request to said link destination of the link included in said response on the basis of said user agent information, the content retrieval request disguised as a content retrieval request issued from the user agent corresponding to the content by converting a user agent value; and acquiring a response according to the type of user agent from said link destination.

12. The method according to claim 11, wherein said receiving step comprises searching the database by using, as a search argument, the location information of the link destination of the link included in said response, to acquire the information on said user agent.

13. A method for collecting information from a site on a network by using a computer connected thereto, comprising:

receiving a response from the site to a content retrieval request issued from a given web-crawling robot and, if a link destination of a link included in the received response has web content that varies according to a type of user agent which is an access source and if the link is included in a database that associates and registers location information of the web content, replacing a URL which is the link destination of the link included in the response with a substitute URL individually corresponding to said user agent corresponding to the web content and sending the response to the web-crawling robot;

receiving the content retrieval request issued from said web-crawling robot to said substitute URL as a destination, replacing said substitute URL with the original link destination URL, wherein the substitute URL is replaced with the original URL of the link destination by acquiring from the database a list of the user agent information of each user agent corresponding to the link, converting user agent information at an HTTP header of the content retrieval request to information on said user agent corresponding to the substitute URL to disguise the content retrieval request to be issued from the user agent, and sending the content retrieval request to the link destination; and receiving a response from said link destination to said content retrieval request whose user agent information was converted, adding identification information of the user agent to the response, and sending the response to said web-crawling robot.

14. A computer-readable storage medium having a program product for controlling a computer connected to a network, said program product comprising:

program code for relaying data exchanged between a site on said network and a web-crawling robot collecting contents by accessing the site;

program code for receiving a response from the site to a content retrieval request issued from said web-crawling robot by using said transmitter-receiver means and, if a link destination of a link included in the response has content that varies according to a type of user agent which is an access source and the link is included in a database that associates and registers location information of the collected contents, expanding the link and acquiring information on the user agent corresponding to the content of the link destination, wherein the link is expanded by acquiring from the database a list of the user agent information of each user agent corresponding to the link; and program code for converting user agent information included in the content retrieval request to said user agent information corresponding to said content of the link destination to disguise the content retrieval request to be issued from the user agent, when said transmitter-receiver means receives the content retrieval request from said web-crawling robot issued, based on said expanded link.

15. A computer-readable storage medium having a program product for controlling a computer connected to a network, said program product comprising:

program code for relaying data exchanged between a web site on the network and a web-crawling robot collecting information by accessing the web site;

program code for receiving a response from the web site to a content retrieval request issued from said web-crawling robot site by using said transmitter-receiver means and, if a link destination of a link included in the response has web content that varies according to a type of user agent which is an access source and if the link is included in a database that associates and registers location information of the collected contents, replacing a URL of the link destination of the link included in the response with a substitute URL individually corresponding to said user agent corresponding to the web content;

program code for replacing the substitute URL with the original link destination URL when said transmitter-receiver means receives the content retrieval request issued from said web-crawling robot to said substitute URL as a destination, wherein the substitute URL is replaced with the original URL of the link destination by acquiring from the database a list of the user agent information of each user agent corresponding to the link; and program code for converting user agent information in an HTTP header of the content retrieval request to information on said user agent corresponding to the substitute URL to disguise the content retrieval request to be issued from the user agent, when said transmitter-receiver means receives the content retrieval request issued from said web-crawling robot to said substitute URL as a destination.

16. The computer-readable storage medium according to claim 15, further comprising program code for searching a database that associates and registers the URL of the web content that individually returns responses according to the type of user agent which is the access source, the information on said user agent corresponding to said web content, and the substitute URL individually corresponding to the user agent with the URL of the link destination of the link included in said response from said web site to a content retrieval request from said web-crawling robot to said web site as an argument, to acquire said substitute URL, said wherein said program code for replacing the substitute URL with the original link destination URL searches said database with said substitute URL in the content retrieval request issued from said web-crawling robot to said substitute URL as a destination as an argument to acquire the original URL of link destination;

and wherein said program code for converting user agent information searches said database with said substitute URL in the content retrieval request issued from said web-crawling robot to said substitute URL as a destination as an argument to acquire the corresponding information of said user agent.

* * * * *